Dec. 29, 1959 H. S. HARRISON 2,919,041
INGOT STACKING APPARATUS
Filed Aug. 7, 1953 15 Sheets-Sheet 1

INVENTOR.
HOMER S. HARRISON
BY
ATTORNEYS

Dec. 29, 1959 H. S. HARRISON 2,919,041
INGOT STACKING APPARATUS
Filed Aug. 7, 1953 15 Sheets-Sheet 4

INVENTOR.
HOMER S. HARRISON
BY
ATTORNEYS

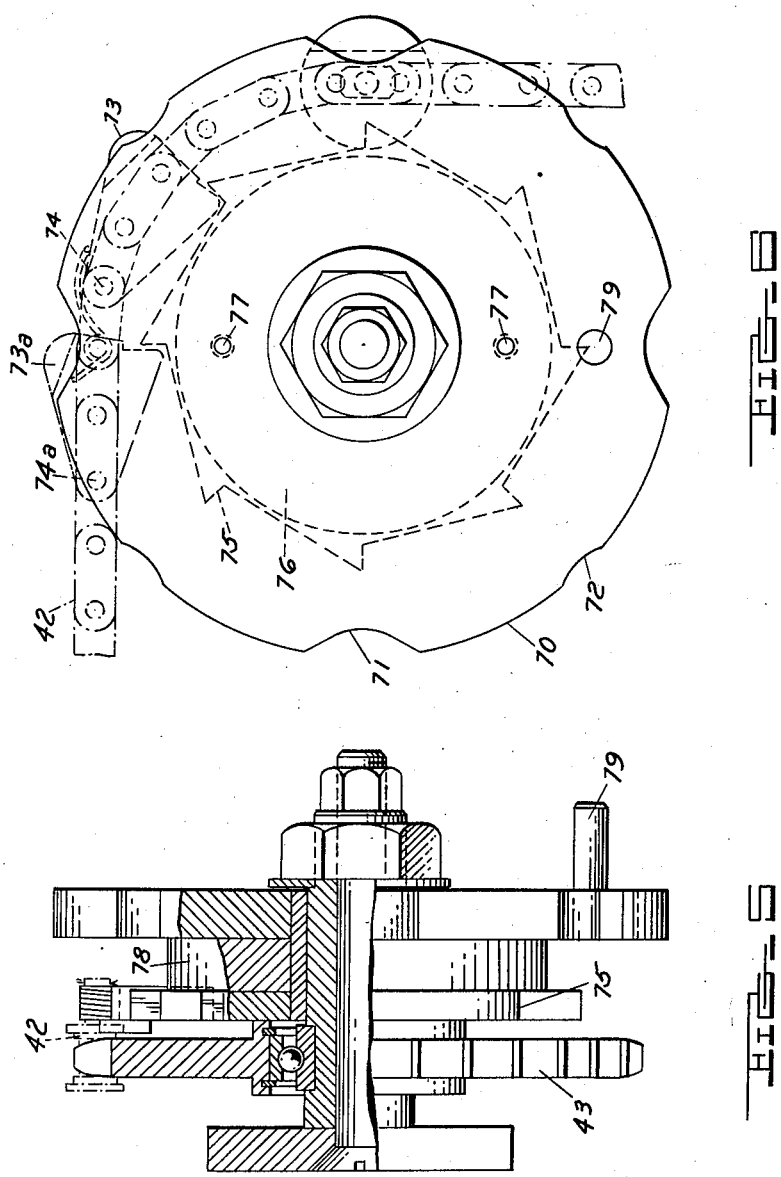

INVENTOR.
HOMER S. HARRISON
BY
ATTORNEYS

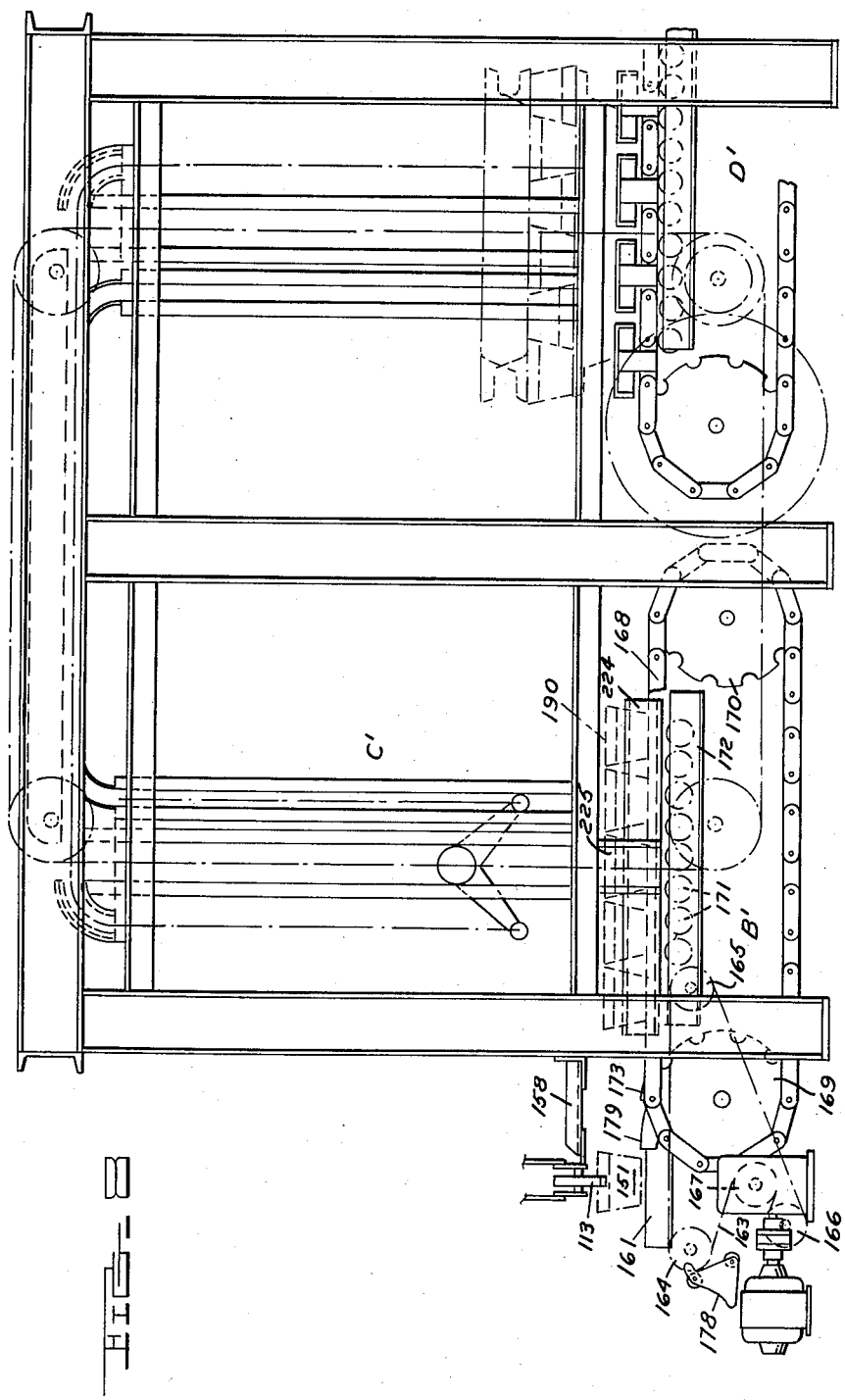

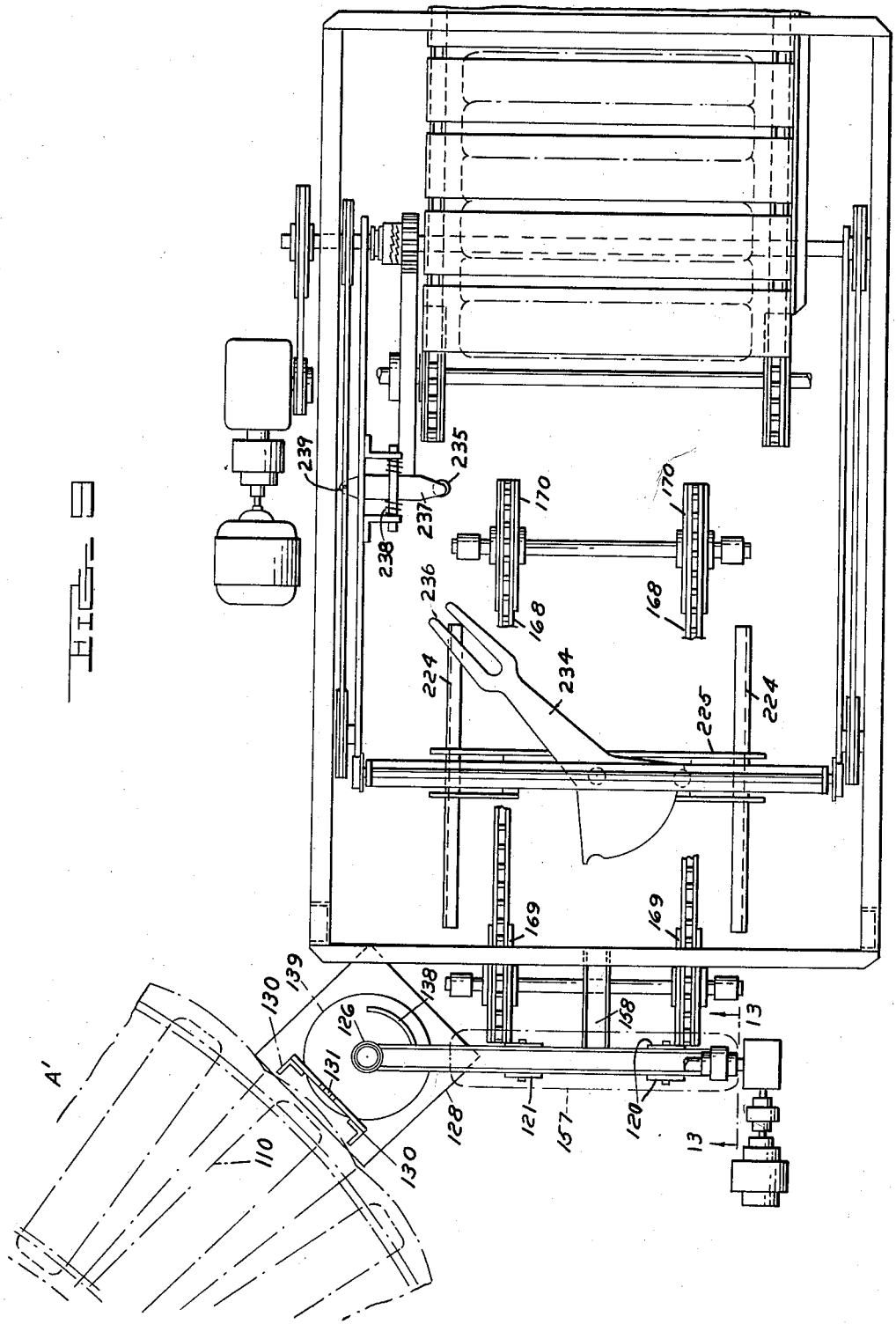

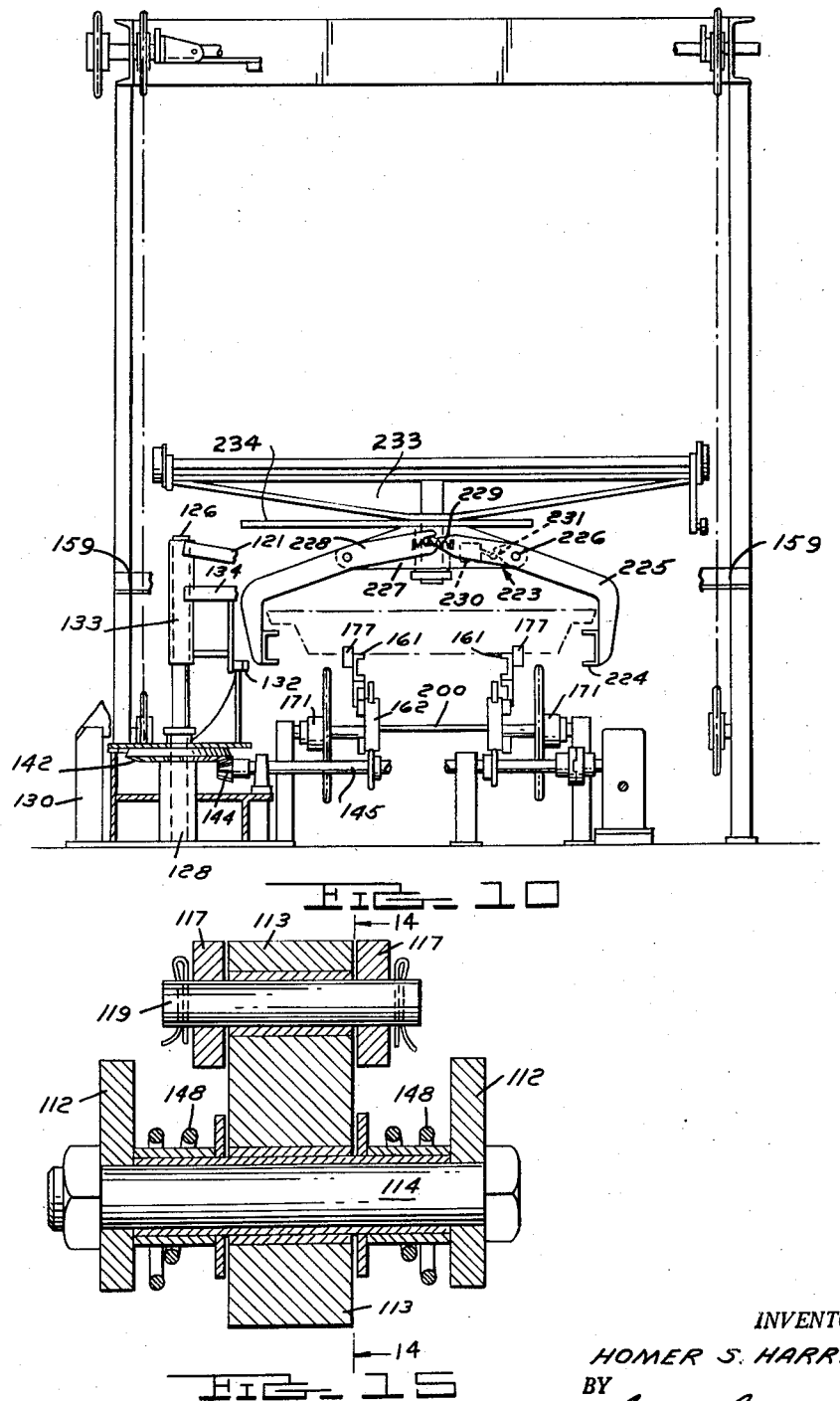

INVENTOR.
HOMER S. HARRISON

ATTORNEYS

Dec. 29, 1959     H. S. HARRISON     2,919,041
INGOT STACKING APPARATUS
Filed Aug. 7, 1953     15 Sheets-Sheet 11
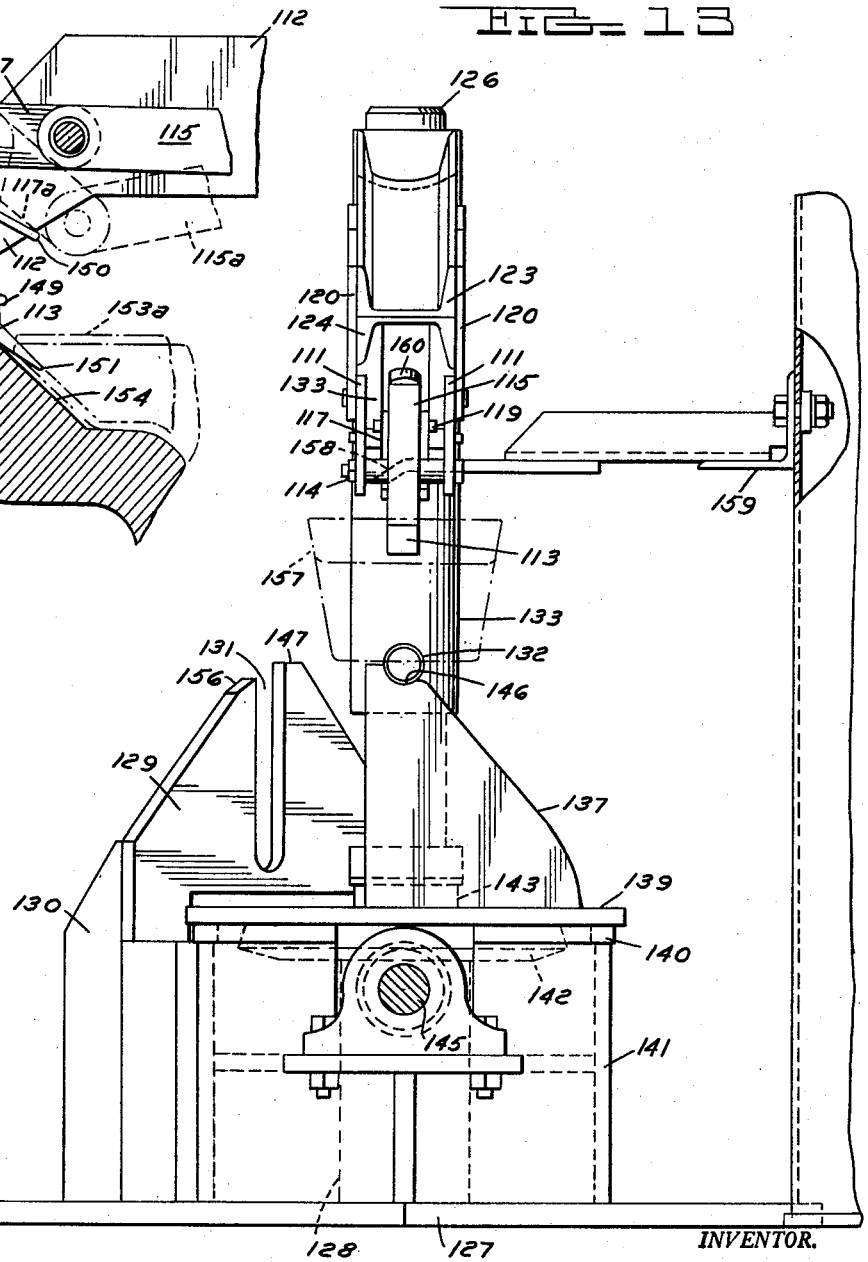
INVENTOR.
HOMER S. HARRISON
BY
ATTORNEYS Dec. 29, 1959  H. S. HARRISON  2,919,041
INGOT STACKING APPARATUS
Filed Aug. 7, 1953  15 Sheets-Sheet 12
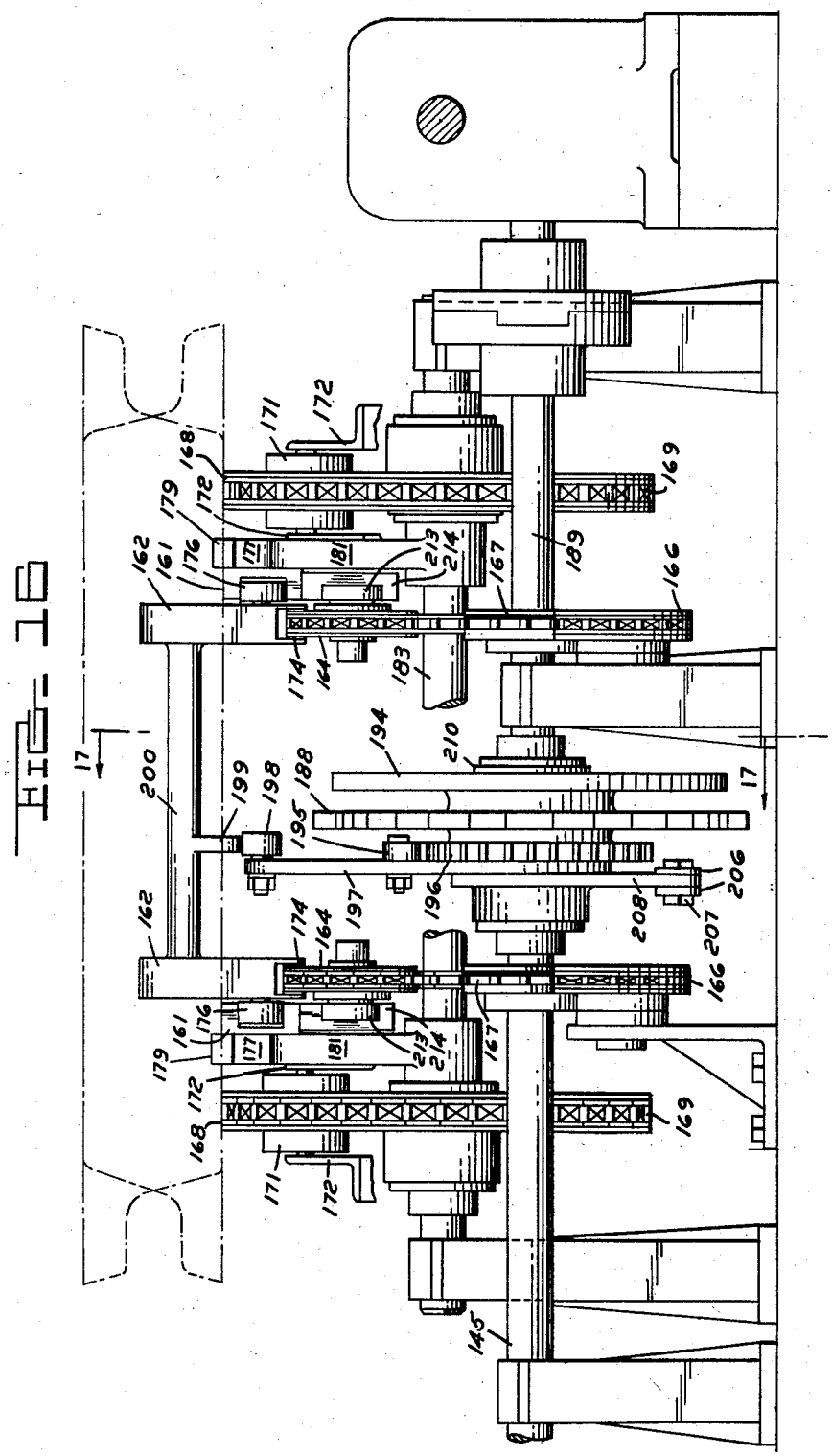

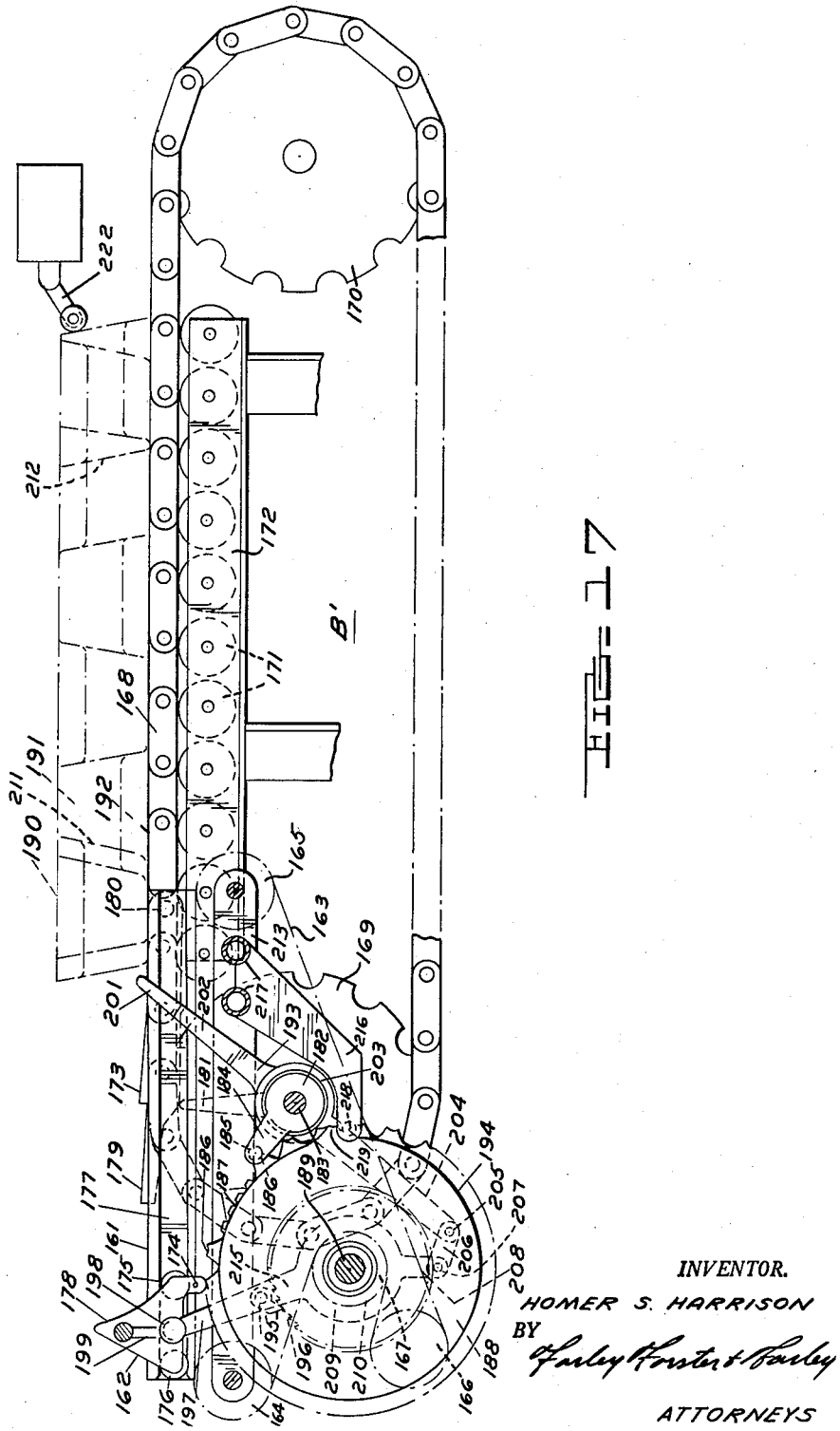

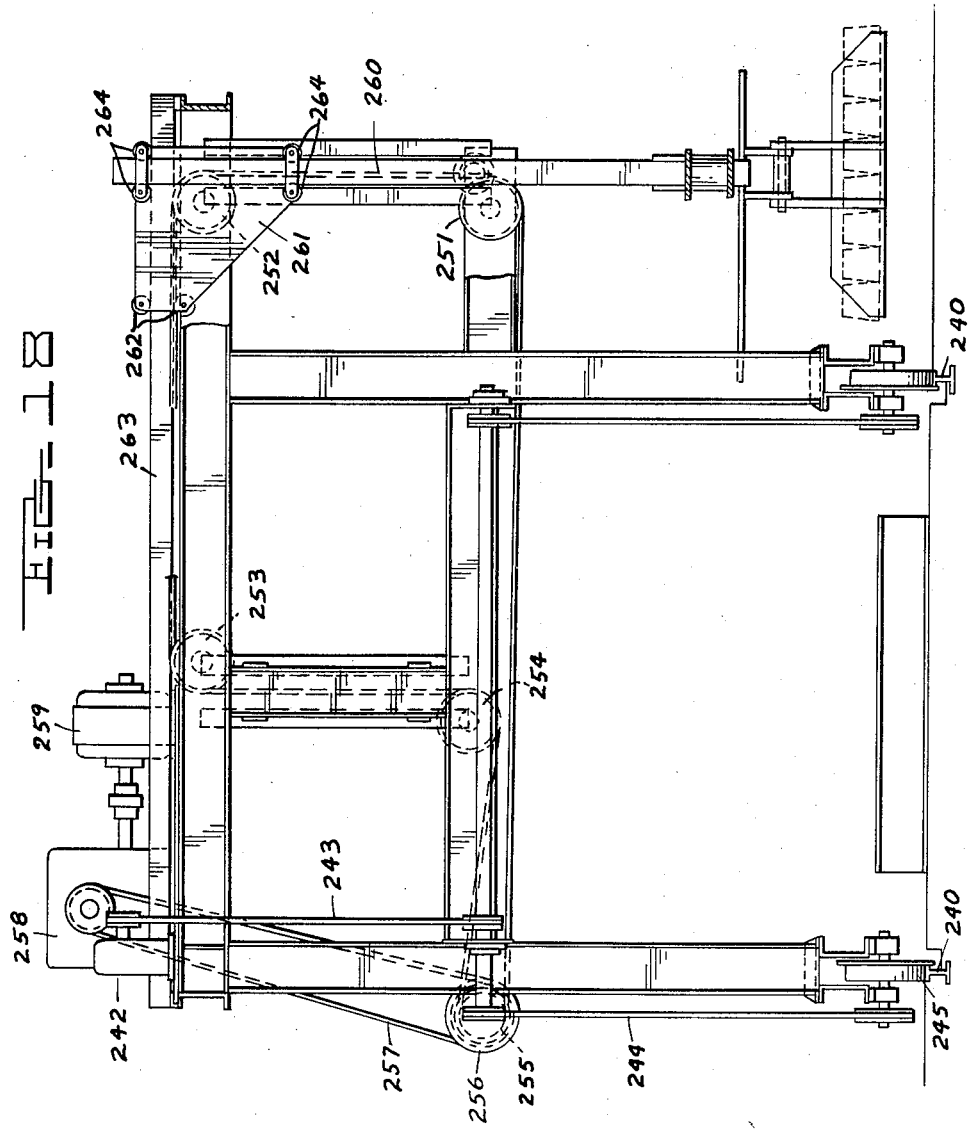

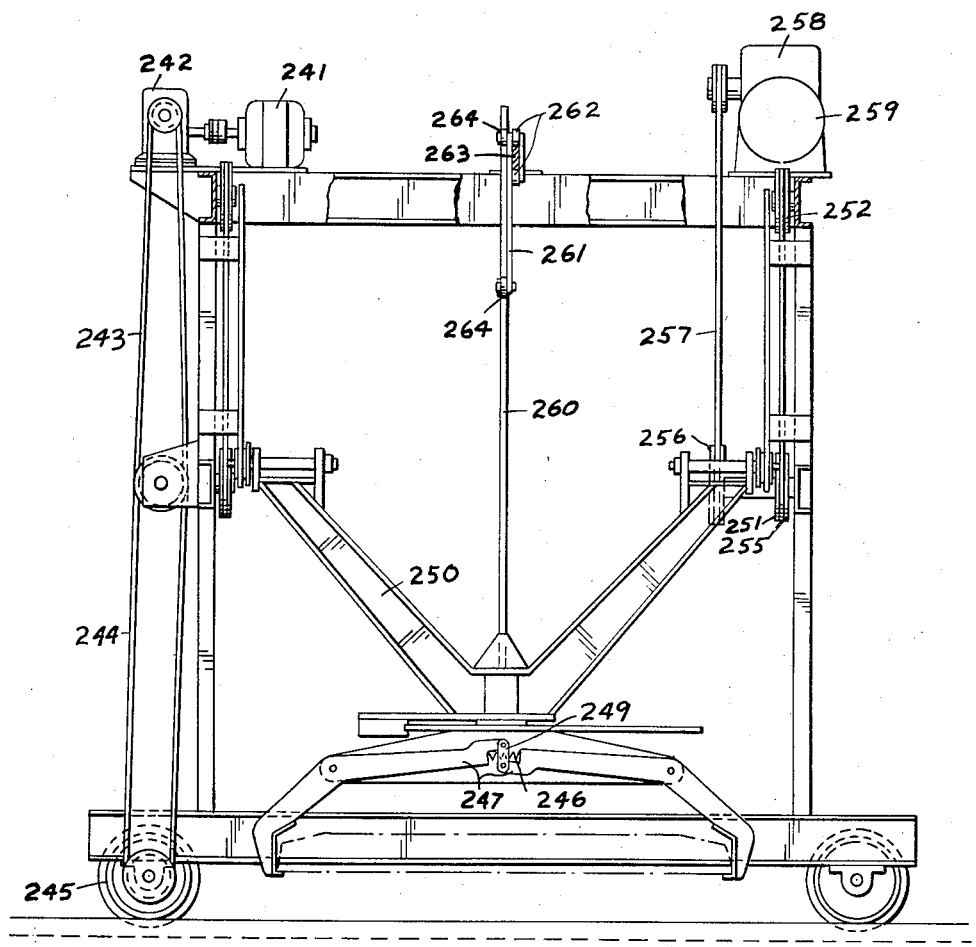

United States Patent Office 2,919,041
Patented Dec. 29, 1959

2,919,041

INGOT STACKING APPARATUS

Homer S. Harrison, Detroit, Mich., assignor to Allied Steel and Conveyors, Inc., Detroit, Mich., a corporation of Michigan Application August 7, 1953, Serial No. 373,017

15 Claims. (Cl. 214—6)

This invention relates to ingot stacking apparatus.

In standard foundry practice, metal ingots may be poured into a series of molds which are carried on an endless conveyor throughout cooling operations. The ingots are thereafter removed from the molds and stacked in tiers suitable for handling by lift trucks, transportation and storage.

The stacking of individual ingots by hand or by manually controlled apparatus has proved to be a laborious and time consuming operation. Yet, the provision of satisfactory automatic mechanical stacking apparatus has been rendered difficult because of many inherent problems and diverse requirements. Mold conveyors may travel in a horizontal path or may discharge by gravity in passing over end sprockets. In the case of a horizontal mold conveyor, the provision of dependable automatic mechanical extracting means is typical of the difficult operations involved. While vacuum equipment might be employed to extract ingots which have fully cooled, the handling temperatures are frequently too high to permit the use of rubber or similar resilient materials providing a suitable sealing lip.

Numerous problems are also raised by the diverse stacking pattern requirements encountered with different types of ingots in different foundries. It is conventional practice to stack ingots in cross tiers in order to provide maximum stability in handling and storage so that provision must be made in any automatic stacking apparatus for rotating alternate tiers. In addition, alternate ingots in each individual tier may be required to be inverted to provide for nesting of tapered ingot surfaces and conservation of space. However, since fork lift trucks are conventionally employed for handling complete stacks and projecting ears at the top ends of the ingots are relied upon for engagement by the lift truck forks, alternate inversion of ingots in the lowermost tier may not be permissible although desired in all subsequent tiers. Thus, provision may be required in automatic stacking apparatus for establishing a bottom tier of upright ingots followed by successive tiers of alternately inverted ingots with each alternate tier being cross stacked. The problem is further complicated by the fact that a fewer number of upright ingots in the lowermost tier can be provided in the same space as nested alternately inverted ingots in the succeeding tiers and special centering provision for the bottom tier may be necessary so that the upright tier will be centrally located below the succeeding tiers.

In order to overcome these various obstacles and meet such varying requirements, it has been necessary to develop alternative mechanisms for the first stage of the stacking operation which would render the apparatus adaptable to either horizontal or gravity discharge mold conveyor operations. For the former, positive acting extraction tongs are provided with mechanism for prying individual ingots loose from the mold together with toggle linkage for locking the tongs in a positive lifting position. For the latter, rotatable discs with recesses formed in the perimeter to receive individual ingots as they drop by gravity out of the molds are employed together with a guide chute for delivering the ingots to a tier conveyor.

In order to meet the requirement for inversion of alternate ingots, selectively operable turnover mechanism is provided which successively tips an ingot first to its side and then over to a fully inverted position during its travel to a tier conveyor. To effect contiguous positioning of the individual ingots in each tier, provision is made for advancing each ingot into engagement with the preceding ingot of the same tier employing the driving contact between such adjacent ingots for actuating the tier conveyor.

Successive tiers are moved from a pickup position on the tier conveyor to a horizontally spaced stacking position by means of tongs adapted to engage and transport a complete single tier and provision is made for rotating such tongs 90° about a vertical axis during movement from pickup to stacking position as well as during return travel. Such rotating mechanism is selectively operable and adapted to effect rotation of alternate tiers only as required for cross stacking.

Provision is made in the tongs for automatic engagement of each tier at the pickup position and automatic release at the stacking position, the latter being responsive to the prevailing stack level while the former is responsive to the accumulation of a complete tier in pickup position.

In order to provide for irregular stacking patterns such as upright ingots in the bottom tier and alternately inverted ingots in succeeding tiers, a stack pattern cam is employed having a number of positions corresponding to the total number of ingots in a complete stack together with mechanism for advancing such cam one unit space with each ingot delivery to the tier conveyor and means responsive to the position of such cam for operating the selective turnover mechanism as required. A similar tier pattern cam is employed having a number of positions corresponding to the number of tiers in a complete stack with means for advancing such cam one unit space with each tier delivery cycle, means responsive to such cam being provided for operating the selective tongs rotation mechanism together with additional means for actuating a stack conveyor to remove a complete stack, such stack actuating means being responsive to a complete revolution of the tier pattern cam.

From the above brief description it may be understood that one of the principal objects of the present invention is to provide a completely automatic ingot stacking apparatus with alternative means for adapting it to the numerous different requirements of individual foundry operations.

Another object is to provide ingot stacking apparatus operating automatically from the point of delivery by a horizontal or gravity discharge mold conveyor to the delivery of complete ingot stacks ready for handling by fork lift trucks or other transporting means.

Another object is to provide means for moving ingots discharged by gravity from a mold conveyor to a horizontal tier conveyor.

Another object is to provide means for extracting ingots from a horizontal mold conveyor and transporting them to a tier conveyor.

Another object is to provide means for establishing contacting engagement of adjacent ingots in each tier for maximum conservation of space and stack stability.

Another object is to provide means for inverting alternate ingots to form a nesting pattern.

Another object is to provide means for selectively controlling the upright or inverted position of each ingot in the complete stack so as, for example, to effect an upright formation in the lowermost tier and an alternate upright and inverted formation in succeeding tiers.

Another object is to provide means for centering the lowermost tier with respect to succeeding tiers having different stacking pattern.

Another object is to provide means for coordinating the stacking operation with the movement of the ingot mold conveyor.

Another object is to provide tong means for engaging a complete tier of ingots.

Another object is to provide such tong means with engaging surfaces capable of handling alternately inverted as well as all upright ingot tiers.

Another object is to provide means for closing said tongs at the pickup position and opening them at the stacking position in response to the prevailing level of the stack.

Another object is to provide reciprocable transfer means for moving said tongs between pickup and stacking positions.

Another object is to provide means for stabilizing such tongs against oscillation during such transfer.

Another object is to provide means for removing each completed stack of ingots in response to the delivery thereto of the uppermost tier of ingots.

Another object is to provide means for transferring tiers to alternative stacks as may be required where different grades of ingots are placed in different stacks.

These and other objects will be more apparent from the following description of preferred embodiments of my invention together with an examination of the drawings disclosing such embodiments wherein:

Fig. 5 is a sectional view of the tier pattern cam and actuating mechanism therefor taken along the line 5—5 of Fig. 3.

Fig. 6 is a front elevation of such cam.

Fig. 8 is a side elevation of modified stacking apparatus adapted to extract ingots from a horizontal mold conveyor and to invert alternate ingots during movement into tier formation.

Fig. 9 is a plan view of such modified stacking apparatus.

Fig. 10 is an end elevation of such modified stacking apparatus omitting the ingot extracting tongs.

Fig. 13 is an enlarged fragmentary view of such extracting tongs taken along the line 13—13 of Fig. 9.

Fig. 14 is an enlarged fragmentary view of one end of the extracting tongs shown in ingot extracting position relative to a mold.

Fig. 15 is a sectional view taken along the line 15—15 of Fig. 14.

Fig. 16 is an enlarged fragmentary end elevation of the tier conveyor shown in Fig. 10.

Fig. 17 is a sectional view of the tier conveyor taken along the line 17—17 of Fig. 16.

Fig. 18 is a side elevation of a further modification of tier tongs and transfer mechanism for moving them between pickup and stacking positions, showing such tongs and transfer mechanism mounted on a wheeled framework moving to alternative stacking positions.

Fig. 19 is an end elevation of the apparatus shown in Fig. 18.

Figure 1:
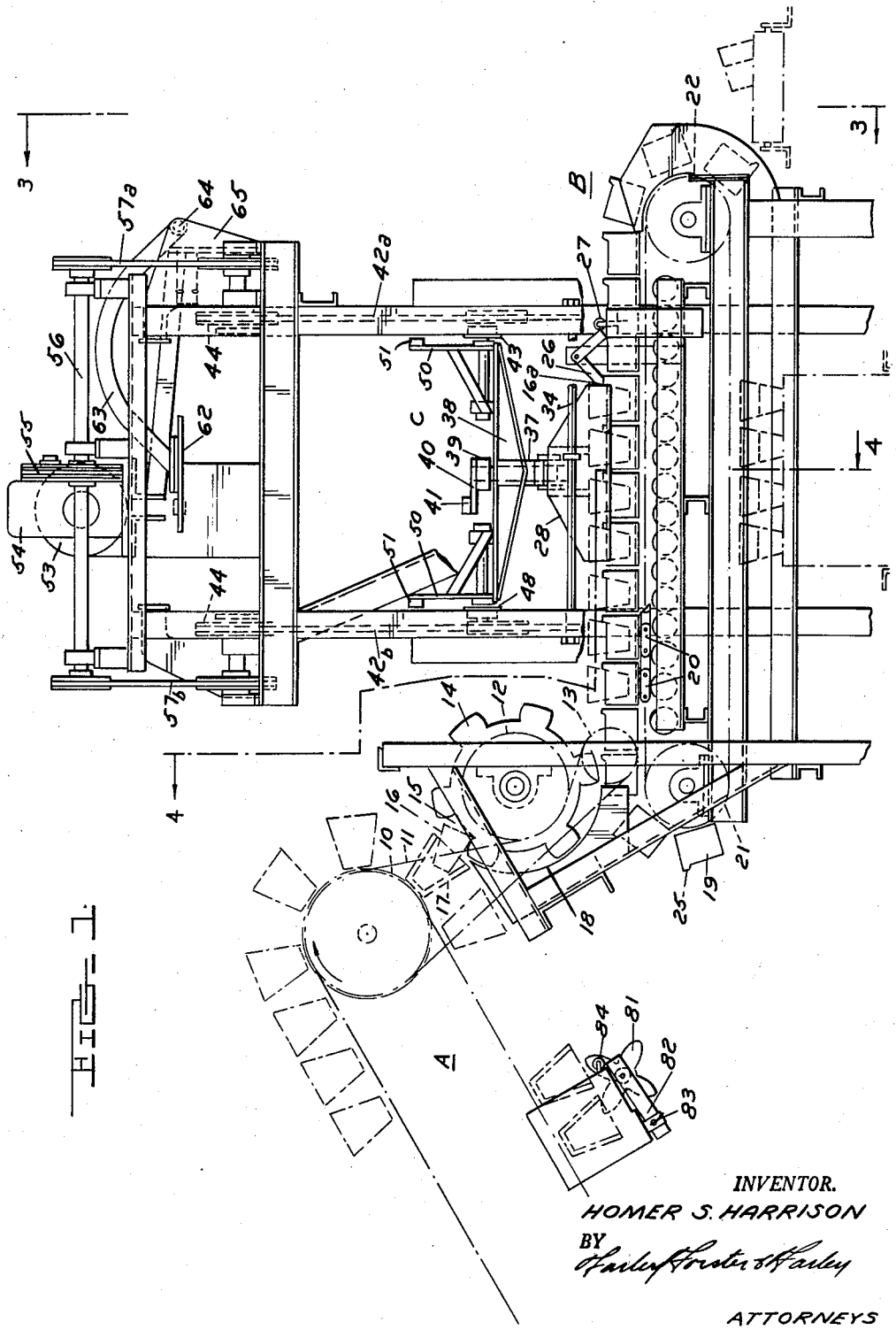
Fig. 1 is a side elevation of the ingot stacking apparatus adapted to receive gravity discharged ingots from a mold conveyor.
Figure 2:
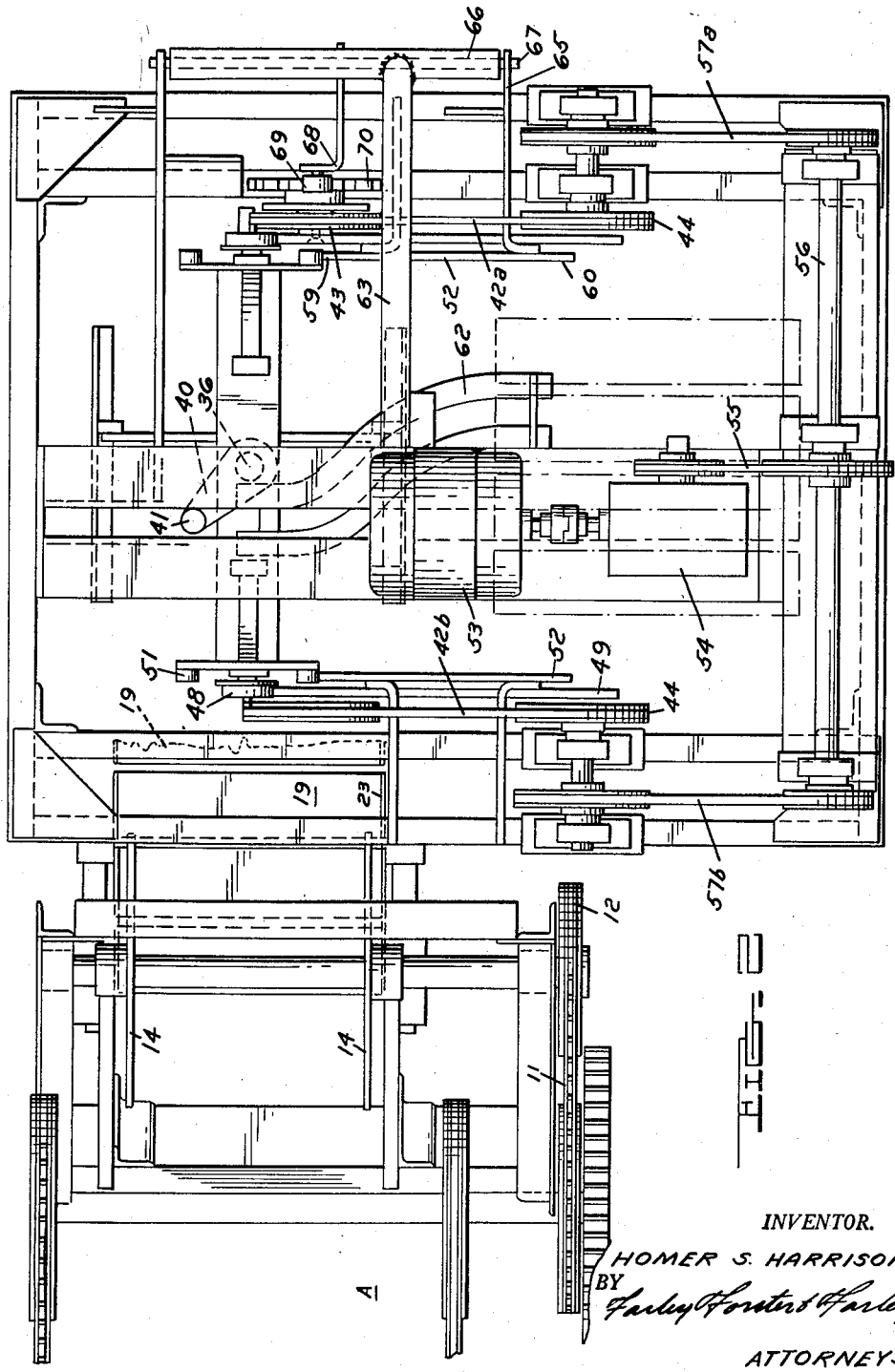
Fig. 2 is a plan view of such apparatus.
Figure 3:
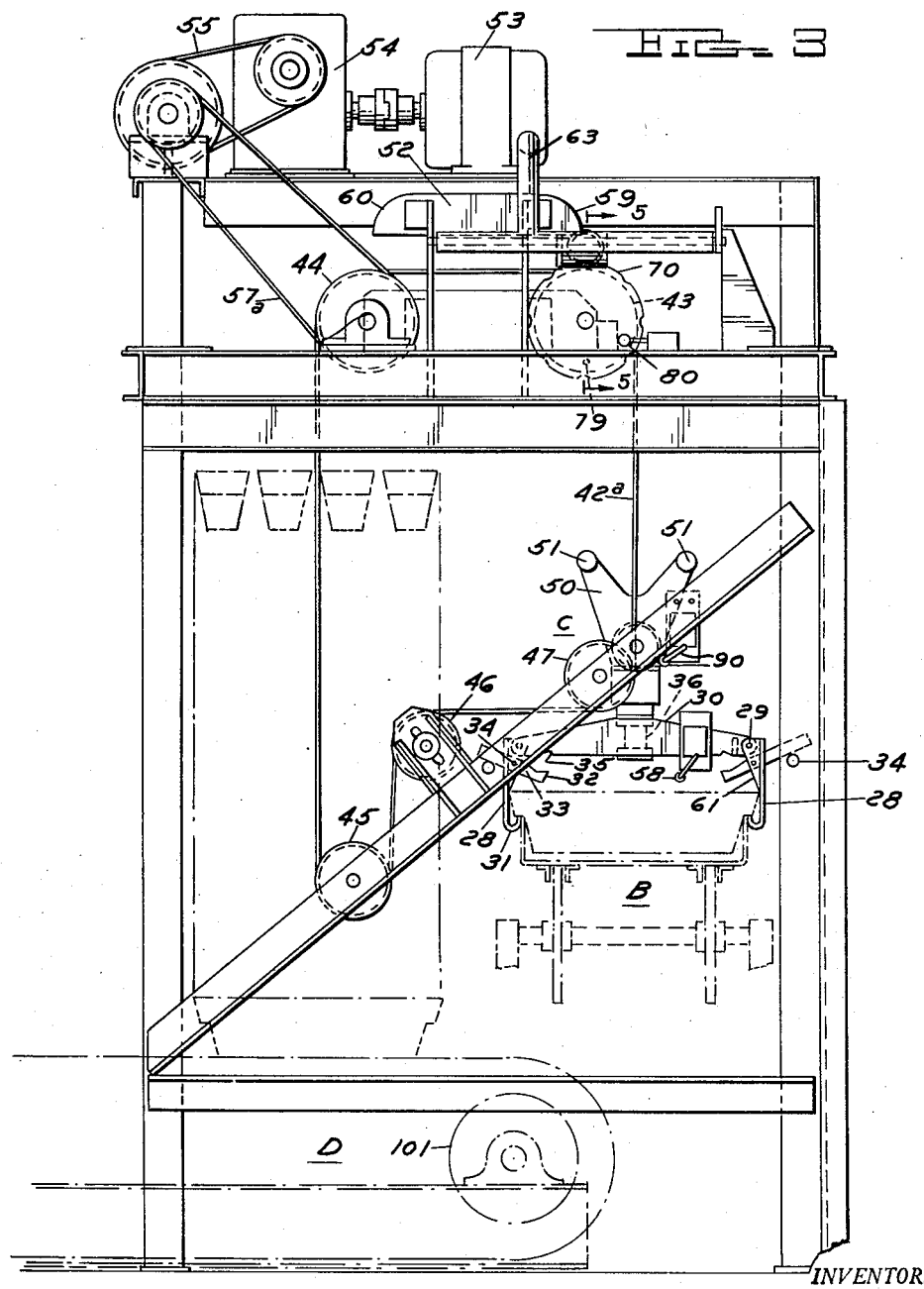
Fig. 3 is an end elevation of such apparatus taken along the line 3—3 of Fig. 1.

Referring to the embodiments shown in Figs. 1, 2, 3 and 4, the detailed construction and operation may best be understood by a general description of the main components and their mode of operation. As seen in Fig. 1, an ingot mold conveyor A delivers ingots to a horizontal tier conveyor B which moves a single tier of four ingots under the transfer mechanism C which as best shown in Fig. 3 raises such tier, transports it longitudinally to a position over a stack conveyor D (rotating alternate tiers 90° during such longitudinal movement), and lowers such tier onto the preceding tier of a stack on the conveyor D. The transfer mechanism then returns for another tier which operation is repeated until a full stack is built up whereupon the conveyor D moves such stack to a position where it may be removed by a floor truck or other transporting apparatus.

Figure 4:
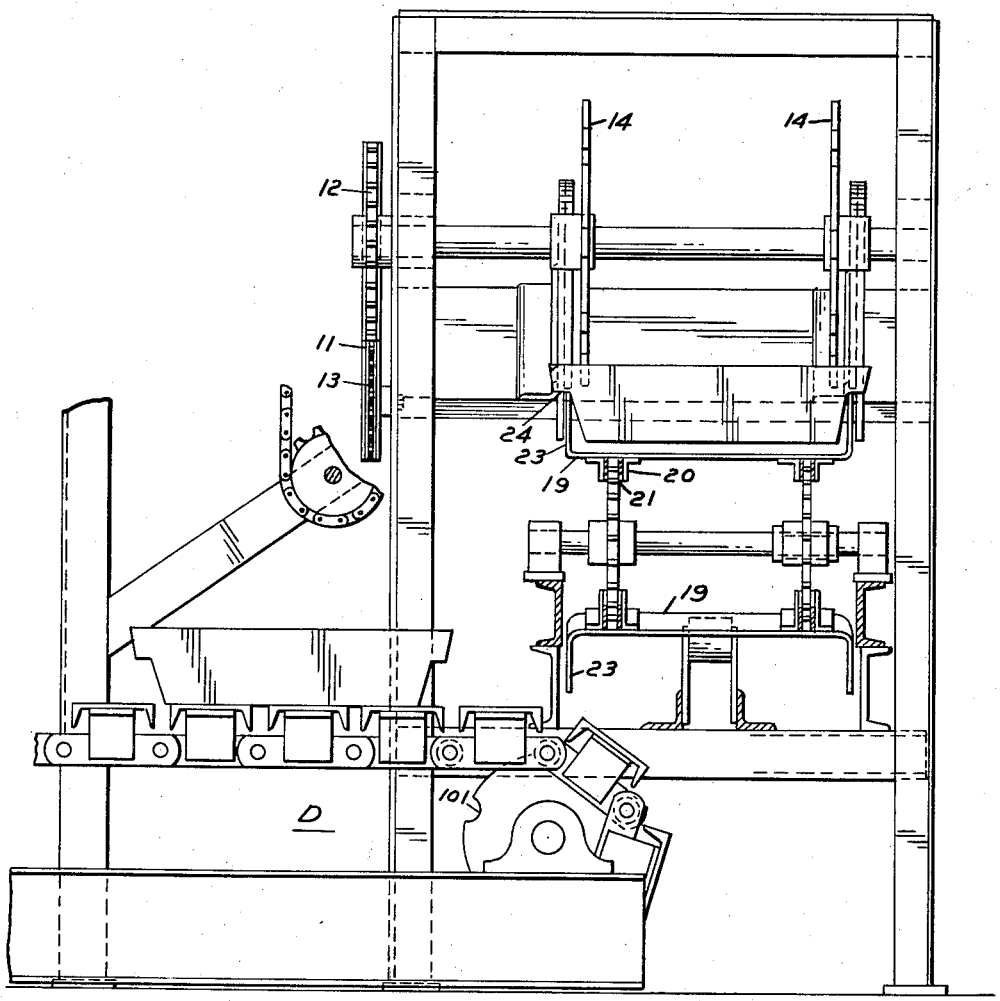
Fig. 4 is an enlarged fragmentary elevation taken along the line 4—4 of Fig. 1.

The mold conveyor A is driven by a motor not shown. A power take-off sprocket 10 drives sprocket 12 in a counterclockwise direction through chain 11 which passes over idler sprocket 13. Sprocket 12 is fixed to a pair of laterally spaced discs 14 intermittently recessed as at 15 to receive an ingot 16 as it is discharged by gravity from a mold 17 passing over the head sprocket of the mold conveyor A. A fixed chute 18 cooperates with the discs 14 to guide the individual ingots downwardly toward the level of the horizontal tier conveyor B which carries a plurality of ingot racks 19 rigidly mounted on the individual links 20 of a conveyor chain passing over end sprockets 21 and 22. As best shown in Figs. 1 and 4 the racks 19 consist of U-shaped channel members having flanges 23 extending upwardly at either end to engage the underside of the ingot ears 24 at points closely adjacent the main body of the ingot. Small projections 25 at the leading edge of each rack flange 23 serve to limit the forward movement of the ingot relative to the conveyor B as it is delivered into such rack at the bottom of the discs 14. Thus, as each ingot slides into position in the rack 19, it engages the projections 25, and continued rotation of the discs 14 serves to drive both the ingot and conveyor B forward until the ingot is disengaged by the driving portions of the discs 14 at which time a new rack 19 will have moved to a receiving position at the end of the chute 18. The conveyor B will thereupon pause to await the delivery of the next ingot. Thus, the conveyor B is automatically intermittently advanced one ingot space by the delivery of an ingot through the discs 14 and in the event of empty molds or ingots sticking in the molds the conveyor will not be advanced with empty racks but will instead await delivery of the next ingot to positively assure completely filled tiers.

The conveyor B progressively advances with the delivery of each new ingot until a leading ingot 16a contacts a pivoted lever arm 26 which actuates a limit switch 27 adapted to initiate the tier transfer operation.

The transfer mechanism includes a pair of tongs 28 best shown in Figs. 1 and 3 which extend the full width of a tier of four ingots. Such tongs are pivotally connected at their upper ends 29 to a pair of transverse suspension bars 30 and have hooks 31 formed at their lower ends to engage the ears on either end of the ingots for lifting the same. While the tongs are being lowered over the pickup position on the conveyor B, the hooks 31 are held in a laterally spread position by the engagement of the ends 32 of counterweighted dogs 33, pivotally connected at 34 to the tongs 28, in notches 35 in the spreader bars 30. As the ends of the hooks 31 of the tongs 28 pass over the upper ends of the ingot ears, the dogs 33 engage fixed stops 34 which trip them out of the notches 35 permitting the tongs to swing inwardly to a position for engaging the ears of the ingots.

The suspension bars 30 are swivelly connected by vertical shaft 36 passing through tube 37 to a transversely extending hanger 38. The upper end of the shaft 36 is connected to a collar 39, a lever arm 40 and roller 41, the latter elements being employed in effecting a 90° rotation of the tongs and ingot tier as later described. The hanger 38 is suspended at either end from a pair of chains 42a, 42b, each of which, as best shown in Fig. 3, passes over five sprockets 43, 44, 45, 46, and 47 defining a rectilinear path for reciprocating travel of the hanger and tongs including vertical components over the respective tier and stack conveyors B and D as well as a horizontal component joining such vertical components. The hanger 38 is provided at either end with rollers 48 adapted to travel on a horizontal track 49 during horizontal movement of the transfer mechanism; also with stabilizing arms 50 having rollers 51 adapted to engage a stabilizing track 52 during such horizontal movement.

The chains 42a and 42b of the transfer mechanism are driven by a motor 53 through reduction gear 54, chain 55, cross shaft 56 and chains 57a, 57b from either end of the cross shaft which in turn drives the respective sprockets 44.

In order to effect a pickup operation at the conveyor B, the motor 53 is run in a direction which will lower the tongs over the ingots in loading position on conveyor B thereby tripping the latches 33 as previously described permitting the hooks 31 to swing under the ears of the ingots as shown in Fig. 3. A stationary limit switch 90 contacted by arm 50 stops the motor 53, by a circuit later described, to await completion of the movement of a complete tier on conveyor B to a pickup position under the tongs which actuates the limit switch 27 restarting the motor 53 in a pickup direction thereby raising the tongs with a tier of ingots.

As the loaded tongs approach the top of their vertical travel, a roller 51 on each of the arms 50 engages the arcuate corner 59 of the stabilizing track 52 and passes onto the horizontal section of such track as the chain suspension point passes off of the sprocket 43. At the transfer mechanism proceeds along a horizontal path, the rollers 48 engage the tracks 49 to support the load and the other rollers 51 come into engagement with the horizontal sections of the tracks 52, the latter rollers maintaining engagement with the arcuate corners 60 of the tracks 52 as the chain suspension point passes over the sprockets 44. Thus, the load is effectively stabilized against horizontal oscillation throughout all horizontal components of travel.

After the chain suspension points pass off of the sprockets 44 the transfer mechanism proceeds downwardly along a vertical path until the ingot tier carried thereby is lowered onto the conveyor D or the uppermost tier of ingots stacked thereon. A slight further downward travel of the hanger 38 will thereafter cause cam surfaces 61 on the tongs 28 to ride down on the corners of the ingots spreading the tongs apart and permitting the nose 32 of the counterweighted dogs 33 to engage the notches 35 for holding such tongs in spread position. Immediately thereafter, the limit switch 58 will contact one of the ingots causing a reversal of the motor drive 53 to effect a return travel of the transfer mechanism to the loading position of conveyor B.

In order to effect 90° rotation of alternate tiers of ingots, a cam track 62, as best shown in Figs. 1 and 2, is provided at the top of the machine to selectively engage the roller 41 during the horizontal travel of the transfer mechanism in alternate transfer cycles, such cam track being adapted to articulate the arm 40, shaft 36 and hanger 38 together with the tongs and ingots suspended therefrom through a 90° angle. The cam track 62 is likewise adapted to rotate the tongs back to normal pickup position upon reverse horizontal travel of the transfer mechanism. The 90° rotation of ingots is limited to alternate tiers by raising the cam track 62 to a position where it will not engage the roller 41 during the horizontal travel of alternate tiers. In order to effect alternate raising and lowering of the cam tracks 62 into and out of operative position, the track is suspended from an arm 63 which is pivotally connected at 64 to brackets 65 mounted on the frame of the machine. As best shown in Fig. 2 the arm 63 is welded to a cross tube 66 piloted on shaft 67 which engages the brackets 65. An actuating arm 68 which is also welded to the cross tube 66 has a roller 69 which engages a stacking cam 70 concentrically piloted on the same shaft as the sprocket 43 but free to rotate relative thereto as best shown in the enlarged views 5 and 6.

The stacking cam 70 as seen in Fig. 6 is provided with alternate deep notches 71 and shallow notches 72 which may be alternately engaged by the roller 69, the deep notches 71 permitting the roller 69, actuating arm 68 and rigidly associated cam track 62 to lower to an operative position for engaging the roller 41, while the shallow notches 72 are of a depth adapted to hold the cam track 62 in its upper inoperative position. The stacking cam 70 is rotated one notch at the beginning of each transfer cycle by the engagement of a dog 73, pivotally connected at 74 to one of the chains 42, with one of the teeth 75 of a ratchet 76 connected to the stacking cam 70 by screws 77 passing through a spacer plate 78. The dog 73 is located on the chain 42 so as to first engage the ratchet 76, as shown by the phantom representation of the dog 73a and pivot 74a, when the transfer mechanism is a distance from its lowermost pickup position equal to a single notch spacing on the stacking cam so that the stacking cam will be advanced one notch only for each transfer cycle.

The stacking cam 70 is provided with a number of notches equal to the number of tiers in a complete stack and at the end of a complete revolution of a stacking cam, a pin 79 projecting from one side of the stacking cam contacts a limit switch 80 which actuates the stack conveyor D by means later described thereby conditioning the apparatus for a complete new stacking cycle.

The speed at which the transfer mechanism is run is adapted to permit the mold conveyor to run continuously. Thus the transfer mechanism C will return from delivering a tier of ingots to a lowermost position directly on the stack conveyor D somewhat before a full tier has advanced on the tier conveyor D to a pickup position which is accompanied by actuation of the limit switch 27 to start the pickup cycle. On the other hand the shortest travel of the transfer mechanism, as in depositing the top tier on a stack and returning to pickup position, exceeds in time that required for the tier conveyor B to advance the next tier one unit ingot space so that whenever the tongs are lowered to pickup position and the dogs 33 are tripped to permit the tongs to swing inwardly one or more ingots will be extending between the tongs to limit their inward travel and the succeeding ingots will thereby be permitted to feed in between the tongs until a complete tier has advanced to pickup position.

As shown in Fig. 1, a mold detector star wheel 81 is rotatably mounted at one end of a spring loaded lever 82 pivotally connected to a stationary mounting at 83. The free end of the lever 82 normally contacts a limit switch 84 and as long as the molds passing the star wheel are empty permitting the projections thereof to rotate into the molds the limit switch 84 will remain actuated by the lever 82. In the event that an ingot fails to eject from the mold at the proper time and continues to travel in the mold along the underside of the mold conveyor, the star wheel will contact such ingot actuating the lever 82 to release the limit switch 84 which is adapted to stop the drive for the mold conveyor until such ingot is manually removed.

Figure 7:
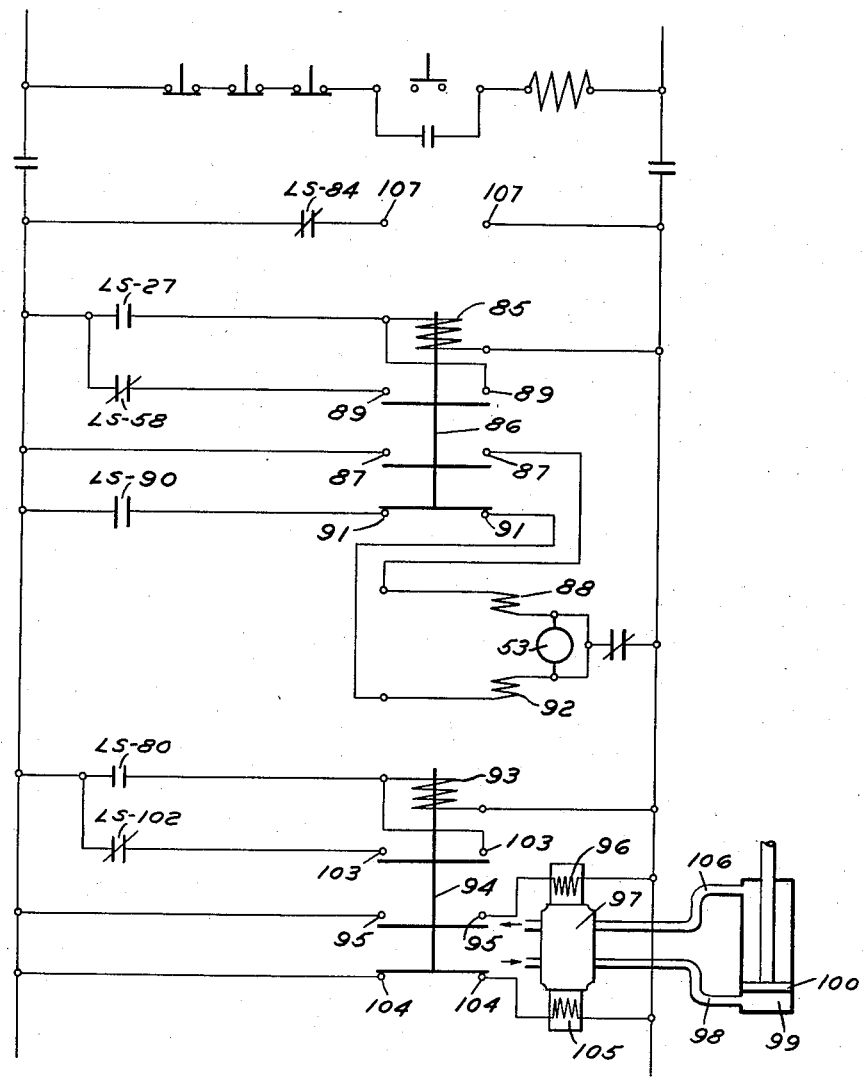
Fig. 7 is a schematic electrical control diagram for the complete ingot stacking apparatus.

Referring now to the electrical control diagram of Fig. 7 it may be seen that when the limit switch 27 is actuated by completion of a tier's movement to pickup position on the tier conveyor B, a circuit is established through the closing coil 85 of a relay 86 thereby closing the contacts 87 to establish a circuit through the forward starter coil 88 for the transfer motor 53 to initiate the pickup travel of such transfer mechanism while at the same time closing contacts 89 to establish a holding circuit through the limit switch 58 on the tong hanger 38, which relay holding circuit is broken when the tier of ingots is deposited on the stack and the limit switch 58 contacts the ingot permitting return of the relay 86 to its normal position as shown. The limit switch 90, which will have closed as soon as the transfer mechanism initially moved upwardly from its pickup position, will now establish a circuit through contacts 91 and the reversing motor contactor 92 for the motor 53 thereby effecting reverse travel of the transfer mechanism back to pickup position whereupon engagement of the arm 50 with the limit switch 90 will open such latter circuit and cause the motor 53 to stop pending a further actuation of the limit switch 27 by an ingot on the tier conveyor B.

When the top tier has been placed on the stack and the transfer mechanism returns to pickup position, the pin 79 on the stack cam 70 momentarily actuates the limit switch 80 in passing closing a circuit through the energizing coil 93 for the relay 94 thereby closing a circuit through contact 95 and the energizing coil 96 of a solenoid valve 97 admitting pressure to the line 98 and fluid pressure cylinder 99 to actuate the piston 100 in a direction adapted to advance the stack conveyor one space through suitable means including a one-way clutch, later described, which is adapted to drive the sprocket 101 of the stack conveyor D. A suitable limit switch 102, having a normally closed contact opened by the completion of the piston 100 travel in advancing the stack conveyor D, serves to establish a holding circuit through contacts 103 which is released by completion of the stack conveyor one unit stack space. This permits return of the relay 94 to its normal position, as shown, closing a circuit through contacts 104 and the energizing coil 105 for returning the solenoid valve 97 to a position for returning the piston 100 by fluid pressure admitted through line 106.

A circuit for suitable mold conveyor motor controls through contacts 107 is opened by the release of limit switch 84 in response to the star wheel contact with an ingot as previously described.

Summarizing the ingot stacking operation it will be understood that the mold conveyor A, which may travel continuously or in intermittent steps, delivers solidified ingots over the end sprockets 10 where they are gravity ejected into recesses of the discs 14, which control the ingots during their travel down the chute 18 and propel them into engagement with the racks 19 on the tier conveyor B which is in turn propelled by the driving engagement between the discs 14, ingots and racks 19. When a complete tier has advanced to pickup position on the tier conveyor B the leading ingot 16a actuates the limit switch 27 starting the transfer motor 53 to raise the tier of ingots from the position shown in Fig. 3. When the transfer mechanism reaches the top of its travel and begins its horizontal travel, the roller 41 will engage the track 62 to rotate the tier 90°, or in the case of alternate tiers, the cam track 62 will be held up in an inoperative position by the stacking control cam 70. As the tier of ingots is next lowered onto the stack conveyor D, or the uppermost tier of any partial stack of tiers thereon, the cam surfaces 61 on the tongs 28 will ride down the ends of the ingots and spread the tongs to a disengaging position held by engagement of the dog ends 33 in the notches 35 and the lowering travel of the tong's hanger 38 will thereupon be stopped by engagement of the limit switch 58 with an ingot top thereby reversing motor 53 and returning the transfer mechanism to pickup position, the stacking control cam 70 being advanced one notch by the final downward travel of the transfer chain 42, and the transfer motor 53 will be stopped by the engagement of the arm 50 with the limit switch 90 pending completion of the movement of a new tier to pickup position on the tier B.

When the stack is completed the stacking cam 70 will have advanced one complete revolution and the return of the transfer mechanism C to the pickup position will thereupon cause the pin 79 on the stacking cam to actuate the limit switch 80 and the air cylinder mechanism 100, shown only in the control diagrams of Fig. 7, for advancing the stack conveyor D one stack space thus completing the stacking cycle. The completed stacks are thereupon removed from the stack conveyor D by floor truck or other suitable means which forms no part of the present invention.

Referring now in general to the embodiment shown in Figs. 8 to 17, it will be seen that provision is made for removing individual ingots from a horizontal mold conveyor A' (Fig. 9), loading them onto a tier conveyor B' (Figs. 8 and 17), successively advancing the individual ingots and tier formed thereby to a position under the transfer mechanism C' (Figs. 8 and 10) which engages and raises such tier, transports it longitudinally to a position over the stack conveyor D' (Fig. 8), and lowers the tier onto the stack, such transfer mechanism then moving back to pick up another tier, etc., until a complete stack is formed on the stacking conveyor whereupon the stacking conveyor moves the stack to an unloading position as in the previously described embodiment.

As hereinafter described in detail, distinctions in the present embodiment relate to extraction means for removing individual ingots from the horizontal molds, means for moving the individual ingots to the tier conveyor B', means for advancing and alternately turning over individual ingots as they are moved into tier formation, modification of tong construction permitting engagement of both upright and inverted ingot ears, actuating mechanism for separating and closing the tongs, means for producing 90° rotation of the tongs, as well as in means for developing special stacking patterns, as where the individual ingots of the lowermost tier are all in upright position to facilitate engagement by the forks of a lift truck while succeeding tiers are formed with alternately inverted ingots in order to conserve space.

Figure 12:
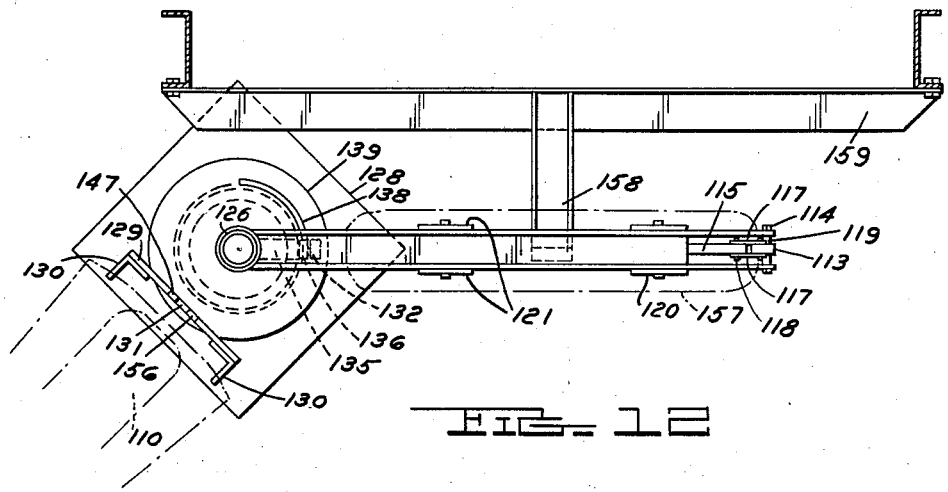
Fig. 12 is a plan view of such extracting tongs taken along the line 12—12 of Fig. 11.

Considering the detailed mechanism in the order of its operation it will be seen that the mold conveyor to which the present embodiment is adapted moves intermittently in a horizontal arc to present successively individual ingots in the position shown at 110 in Fig. 9, at which position they are extracted by mechanism best shown in Figs. 11 to 15. Such operation is performed by ingot extracting tongs 111 which include a pair of transverse bars 112, a pair of pointed tong members 113 pivotally connected at 114 to either end of the bars 112, a pair of toggle actuating links 115 pivotally connected to the bars at 116, a pair of intermediate toggle links 117 pivotally connected at one end 118 to the toggle actuating links and at the other end 119 to an extension of the tong members 113. The bars 112 are suspended by straps 120 and 121 from upper and lower channel members 122, 123 which are rigidly attached to vertical tube 125 rotatably and axially slidably mounted on an upright shaft 126 which is in turn anchored to stationary base plate 127 and tubular column 128. The base plate 127 also mounts a vertical plate 129 supported by angle brackets 130, the plate 129 having a vertically extending recess 131 adapted to engage a roller 132 mounted on a vertical positioning arm 133 connected at its upper end 134 to the channel member 123 and by bracket 135 to the tube 125. A second roller 136 carried by the arm 133 is adapted to engage the inclined surface 137 of a cam member 138 formed as a segment of a cylinder concentric with the axis of the shaft 126, such cam member 138 being mounted on a rotatable plate 139 which rests on an annular thrust bearing 140 supported on a stationary cylindrical base member 141. The rotatable plate 139 is attached to a bevel gear 142 which is piloted by collar 143 on the shaft 126 and actuated by meshing pinion 144 and drive shaft 145. The upper end of the cam face 137 is provided with a detent notch 146 as best shown in Fig. 13 which engages the roller 136 when the ingot extracting tongs 111 and tube 125 are in their uppermost position. When the gear 142 is actuated to rotate the cam 138 in a clockwise direction as seen in Fig. 12, such notch engagement of the roller 136 serves to rotate the ingot tongs 111 with the cam 138 until the roller 132 engages the upper end 147 of the plate 129 which operates as a stop against further clockwise rotation of the ingot extracting tongs while continued clockwise rotation of the cam 138 permits the roller 136 to ride down the cam face 137 while the roller 132 engages the recess 131 thereby producing a direct vertical downward movement of the tongs 111 over an ingot mold in the position shown at 110. In response to such downward movement the pointed tong members 113 engage and extract an ingot from the mold as may best be understood with reference to Fig. 14. As the tongs descend the toggle link and pointed tong members are in the phantom position indicated by 115a, 117a and 113a, established by the relaxed position of the torque spring 148 having a central portion 149 bearing against the tong member 113 and end portions 150 reacting against the ends of plates 112. The points 151a of the tong members 113a will first contact the mold at a point 152 slightly above the ends 153a of the ingot when it rests in the mold. Due to contraction of the ingot material on cooling a slight space between the ends 153a of the ingot and the adjacent surface 154 of the mold provides an opening for the tong point 151a to enter as it progresses down the surface of the mold from the point 152 to a position between a mold surface and the ingot end. As the point 151 so progresses down the surface of the mold, articulation of the tong member 113 about the pivot 114 will occur and after such point has entered between the ingot and the mold a rocking action about the moving fulcrum point 155 will cause the tong ends to engage and dislodge the ingot while at the same time the pivotal connection 119 will operate to straighten the toggle links 117 and 115 to the full line position shown which position is reached at the lowermost point in the travel of the tongs and in which position the toggle links are locked so that subsequent raising of the tongs and pressure of the ingot load against the ends of the tong members 113 will not cause reverse articulation of such tong members.

Upward travel of the tongs is produced by reverse actuation of the gear 142 and cam 137 causing the roller 136 to rise on the cam surface 137 while the roller 132 is engaged in the recess 131 until, when the roller 136 engages the notch 146 and the roller 132 has raised past the end 156 of the plate 129, continued travel of the cam 138 in a clockwise direction will carry the tongs in a raised counterclockwise path to bring the ingot to the position shown at 157 in Fig. 9 in alignment with the conveyor B'.

A fixed toggle braking cam plate 158 attached by suitable bracket members to a fixed frame member 159 is located to engage rollers 160 at the ends of the toggle arms 115 during the final horizontal rotative travel of the tongs to conveyor loading position shown in Figs. 9, 11, 12 and 13 and as the rollers 160 ride up the cam 158 the toggle links 115 and 117 are broken thereby releasing the ingot onto a pair of laterally spaced fixed channel rails 161 which are in alignment with the upper end of the conveyor B', as shown in Figs. 8, 10, 16 and 17. From such position on the rails 161, the ingot is advanced to tier position by a pair of pusher dogs 162 actuated by a drive chain 163 passing over sprockets 164, 165, 166 and 167. During such advance the ingot is delivered onto a pair of chains 168 traveling over end sprockets 169, 170 and supported centrally by a series of rollers 171 journaled in fixed angle members 172. During an ingot's progress along the rails 161, it may be turned over to inverted position by the interaction of the driving dogs 162 and retractable turnover members 173 each having two projections adapted to engage the lower edge of the ingot as it advances and effect successive 90° turnover movements to the ingot as may be more fully understood by reference to the detailed enlarged view of such mechanism shown in Figs. 16 and 17. Each drive dog 162 is moved by chain 163 connected at 174 to a projection extending down from the lower forward end of the drive dog causing first the forward roller 175 and then the trailing roller 176 to engage the channel recess 177 in the rail members 161 whereupon the dog cam surface 178 will engage the lower rearward corner of an ingot on the rail 161 moving it forward until the lower forward corner of such ingot engages the projecting corners 179 of the turnover members 173. Each member 173 is pivotally anchored at 180 to a frame member (not shown) and is held in an upper projecting position by actuating arm 181 fixed along with a second bell crank member 182 on transverse shaft 183, such latter bell crank member being provided with a cam follower arm 184 having a roller 185 adapted to follow the projections 186 and recesses 187 on the perimeter of the cam member 188 which is piloted on transverse shaft 189. The central cam follower arm 184 transmits simultaneous motion to both actuating arms 181 so that when the roller 185 is seated on a relatively high projection 186 of the cam the turnover member 173 will be raised to the intercepting position shown above the level of the rails 161 while when the roller 185 engages the lower notches or recesses 187, the actuating arms 181 will be retracted in a counterclockwise direction to permit the turnover members 173 to drop below the upper surface of the rails 161 in which position an ingot may be moved along the surface without turning over. The pusher dogs 162 will advance each ingot along the surface of the rails 161 to the position shown at 190 and in so doing move such ingot into registration with the preceding ingot shown at 191 thereby advancing the tier of preceding ingots supported on the upper surfaces 192 of the conveyor chains 168 which upper surfaces are in alignment with the upper surfaces of the rails 161.

The stack pattern cam 188 has its perimeter provided with a progressive series of projecting notches 186 and depressed notches 187 equal in number to the total number of ingots in a complete stack, the roller 185 being adapted to progressively engage successive notches each time an ingot is moved forward by the dog 162. The mechanism for advancing the stacking cam 188 one notch for each ingot advancing cycle comprises a pair of interconnected bell crank members 193 and 215 piloted on the respective cross shafts 183 and 189 which are adapted to actuate a pawl 195 and ratchet disc 196 which disc is connected to the stack pattern cam 188. The bell crank member 215 has a lever arm 197 having a roller 198 at its upper end which is contacted during the retraction stroke of the dogs 162 by a pin 199 projecting downwardly from a tie bar 200 extending between the respective dogs 162. When the pin 199 engages the roller 198 during such retraction stroke, it moves the arm 197 and pawl 195 through a distance sufficient to advance the ratchet disc 196 one tooth corresponding to a unit space on the perimeter of the stack pattern cam 188 after which the pin 199 passes over the top surface of the roller 198 and the rollers 176 and 175 leave the internal track surface 177 as the dog is retracted to the position shown in Fig. 8 to provide clearance for horizontal loading of a further ingot.

When the dogs 162 then return to the position shown in Fig. 17 to begin the advance of a new ingot along the rail surface 161 the pin 199 again passes over the roller 198 without actuating the same. As the ingot passes onto the tier conveyor B' it engages the end 201 of a lever arm 202 of the bell crank 193 which is piloted by a sleeve 203 on the collar associated with the lever arm 184. The bell crank 193 has a further lever arm 204 pivotally connected at 205 to a pair of links 206 which are in turn pivotally conected at 207 to a lever arm 208 of the bell crank 215 which is in turn piloted by a ring 209 on a sleeve 210 which carries the ratchet disc 196 and stack pattern cam 188. Thus, as an ingot passes over the end 201 of the lever arm 202 the bell cranks 193 and 215 are actuated to move the lever arm 197 and pawl 195 in a clockwise direction a distance equivalent to one tooth on the ratchet disc 196. In such position the roller 198 will be advanced and raised from the position shown in Fig. 17 where it will be engaged by the pin 199 upon retraction of the dogs 162 as previously explained. Thus, each time the dogs 162 are retracted the stack pattern cam 188 will be moved in a counterclockwise direction one notch while each time an ingot is advanced to a tier engaging position, the pawl 195 is re-set for further actuation of the stack pattern cam by the following retraction of the dogs 162. Where the stack pattern requirements call for alternate turnover of every other ingot as shown in Fig. 17, the cam 188 may be provided with alternate high and low points corresponding to such pattern. However, when the lowermost tier is required to consist of upright ingots to facilitate handling by lift truck forks, the cam 188 may be provided with a series of low notches (as shown near the reference numeral 187 in Fig. 17) at a portion of the cam corresponding to the lowermost tier in order to cause the turnover member 173 to remain in its lower inoperative position throughout the movement of such lowermost tier across the surface of the rails 161. Since the number of upright ingots in such lowermost tier will be smaller than in the succeeding nested tiers and since such lowermost tier will ordinarily have a different over-all width than the succeeding tiers, special provision may be necessary for centering the lowermost tier relative to the succeeding tiers as shown in phantom by the end ingots 211 and 212 of a lowermost tier. The stroke of the pusher dog 162 in pushing the last ingot of a tier into position determines the pickup position of such tier, and provision is made in the present embodiment for causing the pusher dog 162 to have a different stroke of travel in the case of the last ingot of the lowermost tier as required, for example, to move the ingot 211 to a slightly more advanced position than in the case of the last ingots of the succeeding tiers, as indicated at 190. In order to accomplish this the spacer bars 213 for the chain sprockets 164 and 165 are slidably mounted in guide rails 214 and are connected by tie bars 217 to an arm 216 and roller 218 adapted to follow the surface of a second cam member 194 rotating with the cam 188. The cam 194 is provided with a single projection 219 at a position corresponding to the last ingot of the lowermost tier which, acting through the roller 218, arm 216, tie bars 217 and sprocket bars 213, operates to advance the sprockets 164 and 165 and the corresponding terminal point of the stroke of the dog 162 to provide proper centering for the lowermost tier. When, upon the following cycle of the pusher dog 162, the high point 219 of cam 194 is advanced out of engagement with the roller 218, drive reaction of the dogs 162 against chains 163 will return the sprockets 164 and 165 to their normal position limited by the engagement of the roller 218 against the generally cylindrical surface of the cam 194.

Figure 11:
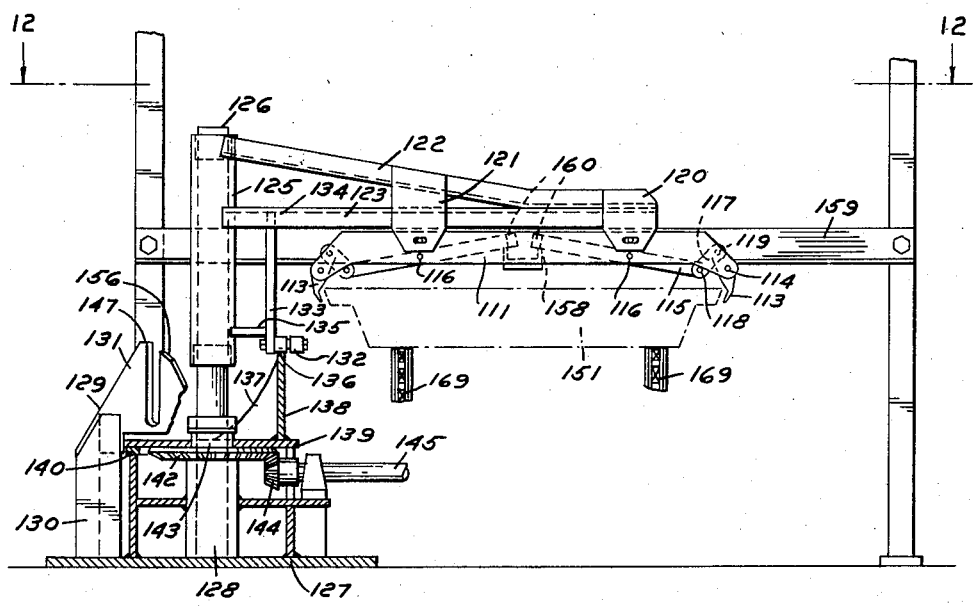
Fig. 11 is a similar fragmentary end elevation showing the extracting tongs per se.

It will be understood that the drive for the pusher dog is synchronized with the drive for the ingot tongs through the use of a common drive shaft 189, the extension 145 of which drives the pinion 144 and gear 142 as shown in Fig. 11. When the drive shaft 189 and sprocket 167 are turned in a clockwise direction as seen in Fig. 17, the dog 162 will be retracted while the tongs will be driven in a counterclockwise direction as seen in Fig. 9 as required to move an ingot from a mold to the rails 161, while reverse movement of the drive shaft 189 will effect a return of the tongs to the ingot mold conveyor while the dogs 162 are actuated to advance the ingot onto the tier conveyor B'. In order to provide clearance for an ingot moved by the tongs onto the surface of the rails 161, the dog 162 must drop to a noninterfering position early enough to provide such clearance and, as shown in Fig. 8, may be carried back as far as necessary on the chain 163 to provide such proper clearance timing.

When a tier of ingots has advanced to pickup position as shown in Figs. 8 and 17, a limit switch 222 is actuated to initiate the transfer cycle as in the previously described embodiment. In order to accommodate either all upright or alternately inverted and upright ingots, transfer tongs 223 are provided with channel members 224 having upper and lower flanges adapted to engage the ears of either upright or inverted ingots as may be best seen in Fig. 10. Tong arms 225 are pivoted at 226 to hanger bar 227 and are provided with interlocking extensions 228 urged by compression spring 229 to an overcenter position corresponding to either a closed pickup position as shown or to an open release position when the extensions 228 are moved downwardly to their lowermost overcenter position. It will be understood that opening of the tongs is effected by continued downward movement thereof after depositing a tier of ingots in stacking position through engagement of the arms 225 with the ends of the ingots. The limit switch 230 mounted on the hanger bar 227 is actuated by an extension 231 on one of the arms 225 when the arms are opened to release position thereby performing the function of the limit switch 58 in the earlier embodiment in reversing the transfer motor to effect a return of the tongs to pickup position. Closing of the tongs in pickup position is effected by engagement of the ends of the arms 225 with fixed cam surfaces, not shown, during their final downward travel at the pickup station. A limit switch, not shown, similar to limit switch 90 in the first embodiment stops the transfer motor pending completion of the movement of a tier of ingots to pickup position on the conveyor B'. The electrical control circuit for the present modification is similar to that for the first embodiment and therefor is not repeated.

Referring to Figs. 9 and 10, alternate rotation of tiers is effected by a pivotal suspension of the tongs from the chain actuated transverse member 233, a slotted arm 234 connected to the tongs' bar 227, and a retractable roller 235 adapted to engage the slotted end 236 of the arm 234 as it passes along the upper horizontal transfer path. The roller 235 is carried by an arm 237 which is resiliently held in a normal central position by springs 238 and which may be actuated by an extension 239 to an inoperative position where the roller 235 will lie above the plane of the arm 234 during the transfer operation. The resilient mounting of the arm 237 operates to avoid sudden acceleration loads on the tong mechanism when the roller 235 engages the slotted end 236 to effect a 90° rotation of the tongs and ingot tier carried thereby. It will be understood that linkage actuated by a cam (not shown), similar to the cam 70 of the first embodiment may be employed to actuate the arm 237 to its operative and inoperative positions for alternate transfer cycles.

Referring to the further modification of Figs. 18 and 19, it will be seen that a traveling transfer mechanism is provided which is capable of delivering ingot tiers from a plurality of tier conveyors to a plurality of stacks as may be required where different grades of ingots are segregated, by means not pertinent to the present disclosure, before delivery to a particular ingot conveyor. The ingot conveyors, not shown, extend normal to the transfer mechanism tracks 240, and move the ingot tiers to a pickup position as shown. The entire transfer mechanism is mounted on a four-wheeled frame and may be moved into alignment with any tier conveyor by a drive motor 241, reduction gear 242, and drive chains 243, 244, coupled to one of the wheels 245.

The transfer tongs in this modification are similar to those last described utilizing a compression spring 246 to urge the tong extensions 247 to an overcenter position relative to pivot centers 248, the extensions being connected by a link 249 adapted to limit the overcenter travel to a pickup position, as shown, and a release position with the tongs spread and the spring 246 below the pivot centers 248. The tongs are pivotally suspended from a chain actuated cross member 250 which is reciprocated in a transfer path established by endless chains running over sprockets 251, 252, 253, 254 and 255, the latter sprocket being coupled to a drive sprocket 256 driven by chain 257 from reduction gear 258 and motor 259.

A modified stabilizing arm 260 maintains the tongs and load against oscillation in the transfer plane through the action of a plate 261 having rollers 262 adapted to move along a fixed horizontal guide bar 263 and rollers 264 adapted to accommodate vertical movement of the stabilizing arm 260 relative to the plate 252. Thus the tongs and stabilizing arm are free to move in a vertical path while the stabilizing arm and plate assembly are free to move in a horizontal path, while the rollers 264 confine the stabilizing arm against oscillation during such movement.

From the above description of the first embodiment and modifications thereto it will be understood that ingot stacking apparatus has been provided which meets each of the objects initially set forth. It will also be understood that numerous further modifications in detailed construction may be resorted to without departing from the scope of my invention as defined in the following claims.

I claim:

1. Ingot stacking apparatus comprising means for accumulating a horizontal tier of ingots at a pickup position, tong means for engaging a tier of ingots at said pickup position, reciprocable transfer means for moving said tong means from said pickup position to a horizontally spaced stacking position, said tong means being pivotally connected to said transfer means for rotation on a vertical axis, and selectively operable means for imparting a 90° rotation to said tong means during movement between said pickup and stacking positions, said last means comprising a cam track extending along a portion of the path of said tong means movable to operative and inoperative positions, and a member connected to said tong means adapted to engage said cam means when in operative position to effect said 90° rotation of said tongs.

2. Ingot stacking apparatus comprising means for accumulating a horizontal tier of ingots at a pickup position, tong means for engaging a tier of ingots at said pickup position, reciprocable transfer means for moving said tong means from said pickup position to a horizontally spaced stacking position, said tong means being pivotally connected to said transfer means for rotation on a vertical axis, and selectively operable means for imparting a 90° rotation to said tong means during movement between said pickup and stacking positions, said last means comprising an arm connected to said tong means and extending laterally away from said pivotal axis, a slot in said arm, a retractable pin movable to a position in the path of said arm for engaging said slot during a portion of the travel of said tong means past said pin, the duration of engagement of said pin and said slotted arm being adapted to effect said 90° rotation of said tong means.

3. Ingot stacking apparatus comprising means for accumulating a horizontal tier of ingots at a pickup position, tong means for engaging a tier of ingots at said pickup position, reciprocable transfer means for moving said tong means from said pickup position to a horizontally spaced stacking position, said tong means being pivotally connected to said transfer means for rotation on a vertical axis, and selectively operable means for imparting a 90° rotation to said tong means during movement between said pickup and stacking positions, said last means comprising an arm connected to said tong means and extending laterally away from said pivotal axis, a slot in said arm, a retractable pin movable to a position in the path of said arm for engaging said slot during a portion of the travel of said tong means past said pin, the duration of engagement of said pin and said slotted arm being adapted to effect said 90° rotation of said tong means, said pin being resiliently mounted to effect a shock absorbing action in transmitting rotative movement to said tong means.

4. Ingot stacking apparatus comprising means for accumulating a horizontal tier of ingots at a pickup position, tong means for engaging a tier of ingots at said pickup position, reciprocable transfer means for moving said tong means from said pickup position to a horizontally spaced stacking position, said tong means being pivotally connected to said transfer means for rotation on a vertical axis, selectively operable means for imparting a 90° rotation to said tong means during movement between said pickup and stacking positions, and means for effecting actuation of said selectively operable means in alternate tier transfer cycles, said last means comprising a tier pattern cam having successive high and low points in its surface, ratchet means for advancing said cam one position in response to each tier stacking cycle, and linkage between said tier pattern cam and said selectively operable means.

5. Ingot stacking apparatus comprising means for accumulating a horizontal tier of ingots at a pickup position, tong means for engaging said tier at said pickup position, reciprocable transfer means for moving said tong means from said pickup position to a stacking position, a vertical axis pivotal connection between said tong means and said transfer means, selectively operable means for effecting a 90° rotation of said tong means during travel from pickup to stacking position, means responsive to alternate transfer cycle for rendering said last means operative and inoperative in order to effect a cross tier stacking pattern, said last means including a rotatable cam having a number of high and low points corresponding to the number of tiers in a complete stack, means for advancing said cam one unit space for each transfer cycle, and means responsive to the high and low points on said cam for controlling said selectively operable means.

6. Ingot stacking apparatus as set forth in claim 5 wherein a stack conveyor is provided at said stacking position to move each complete stack away to provide clearance for further stacking operations, together with means for actuating said stack conveyor one unit stack space.

7. Ingot stacking apparatus as set forth in claim 5 wherein a stack conveyor is provided at said stacking position to move each complete stack away to provide clearance for further stacking operations, together with means for actuating said stack conveyor one unit stack space and wherein means are provided responsive to each complete revolution of said tier pattern cam for initiating the actuation of said stack conveyor.

8. Ingot stacking apparatus comprising means for successively extracting individual ingots from molds on a horizontal ingot mold conveyor and depositing them at a receiving station characterized by a cross beam having pivoted wedging elements adapted for simultaneous insertion between opposite ends of an ingot and its mold, resilient means urging said wedging elements outwardly for initial engagement with the sloping ends of a mold, means for lowering said cross beam utilizing the reaction of said sloping ends for pivoting said wedging elements as required to wedge them between the mold and ingot ends, and pivoting limiting means for locking said wedging elements in an ingot raising position.

9. Ingot stacking apparatus as set forth in claim 8 wherein said last means includes toggle linkage aligned by final pivoting movement of said wedging elements for locking them in an ingot raising position.

10. Ingot stacking apparatus as set forth in claim 9 including cam means adapted to brake said toggle linkage and release said ingot at said receiving station.

11. Ingot stacking apparatus comprising means for extracting an ingot from a mold on a horizontal mold conveyor, a tier conveyor, and means for moving said ingot to said tier conveyor, said last means comprising an arm carrying said ingot extracting means, common means for pivotally and axially slidably mounting said arm on a single vertical axis and a co-axially rotatable cam track having an inclined surface adapted to engage and raise and lower said arm when rotated relative to said arm as well as to carry said arm in a raised position through the arc of travel between said mold and ingot conveyors.

12. Ingot stacking apparatus as set forth in claim 11 including vertical guide means adapted to arrest the rotative movement of said arm during the lowering and raising thereof in the ingot extracting operation.

13. Ingot stacking apparatus comprising means for accumulating successive single horizontal tiers of ingot at a pickup position, tong means for engaging a single tier of ingots at said pickup position, reciprocable transfer means responsive to completion of a single tier accumulation for moving said tong means from said pickup position to a stacking position, means for releasing said tier of ingots from said tong means at the prevailing stack level, and means responsive to said prevailing stack level for returning said tong means to said pickup position, said tong means comprising a horizontal beam, a pair of tong members pivotally connected to said beam, tier engaging ends on said tong members movable to engaging and releasing positions, opposed inward extensions on said tong members movable to overcenter positions corresponding to said tier engaging and releasing positions of said tong ends, resilient means interposed between said opposed extensions adapted to hold said extensions in either of said overcenter positions, means responsive to the lowering of said tong means to a pickup position for actuating said tong members to tier engaging position, and means responsive to the lowering of said tongs into ingot stacking position for actuating said tong members to a tier releasing position.

14. Ingot stacking apparatus comprising means for accumulating successive single horizontal tiers of ingot at a pickup position, tong means for engaging a single tier of ingots at said pickup position, reciprocable transfer means responsive to completion of a single tier accumulation for moving said tong means from said pickup position to a stacking position, means for releasing said tier of ingots from said tong means at the prevailing stack level, and means responsive to said prevailing stack level for returning said tong means to said pickup position, said tong means comprising a horizontal beam, a pair of tong members pivotally connected to said beam, tier engaging ends on said tong members movable to engaging and releasing positions, opposed inward extensions on said tong members movable to overcenter positions corresponding to said tier engaging and releasing positions of said tong ends, resilient means interposed between said opposed extensions adapted to hold said extensions in either of said overcenter positions, means responsive to the lowering of said tong means to a pickup position for actuating said tong members to tier engaging position, and means responsive to the lowering of said tongs into ingot stacking position for actuating said tong members to a tier releasing position, said opposed inward extensions being connected by a vertical link.

15. Ingot stacking apparatus comprising means for accumulating successive single horizontal tiers of ingot at a pickup position, tong means for engaging a single tier of ingots at said pickup position, reciprocable transfer means responsive to completion of a single tier accumulation for moving said tong means from said pickup position to a stacking position, means for releasing said tier of ingots from said tong means at the prevailing stack level, and means responsive to said prevailing stack level for returning said tong means to said pickup position, said tong means comprising a horizontal beam, a pair of tong members pivotally connected to said beam, tier engaging ends on said tong members movable to engaging and releasing positions, opposed inward extensions on said tong members movable to overcenter positions corresponding to said tier engaging and releasing positions of said tong ends, resilient means interposed between said opposed extensions adapted to hold said extensions in either of said overcenter positions, means responsive to the lowering of said tong means to a pickup position for actuating said tong members to tier engaging position, and means responsive to the lowering of said tongs into ingot stacking position for actuating said tong members to a tier releasing position, said tong ends being formed with vertically spaced engaging lips adapted to simultaneously engage vertically spaced ingot lips of both upright and inverted ingots in any single tier.

References Cited in the file of this patent

UNITED STATES PATENTS

| | | |
|---|---|---|
| 586,866 | Potter | July 20, 1897 |
| 713,029 | Wellman et al. | Nov. 4, 1902 |
| 1,039,725 | Gathmann | Oct. 1, 1912 |
| 1,389,794 | Thiele et al. | Sept. 6, 1921 |
| 1,490,235 | Smith et al. | Apr. 15, 1924 |
| 1,673,237 | Gerdes | June 12, 1928 |
| 1,728,483 | Fitz Gibbon | Sept. 17, 1929 |
| 2,108,457 | Tobia | Feb. 15, 1938 |
| 2,120,315 | Spellacy et al. | June 14, 1938 |
| 2,224,913 | Johnson et al. | Dec. 17, 1940 |
| 2,253,283 | Minaker | Aug. 19, 1941 |
| 2,384,179 | Knies | Sept. 4, 1945 |
| 2,401,592 | Von Stocker | June 4, 1946 |
| 2,431,320 | Fischer | Nov. 25, 1947 |
| 2,467,113 | Deiters | Apr. 12, 1949 |
| 2,519,354 | Chamberlin et al. | Aug. 22, 1950 |
| 2,524,846 | Socke et al. | Oct. 10, 1950 |
| 2,540,612 | Fischer et al. | Feb. 6, 1951 |
| 2,598,222 | Cahners et al. | May 27, 1952 |
| 2,609,108 | Peterson et al. | Sept. 2, 1952 |
| 2,681,722 | Fischer et al. | June 22, 1954 |
| 2,730,279 | Enock | Jan. 10, 1956 |
| 2,738,216 | Segur | Mar. 13, 1956 |